United States Patent [19]

Ottesen et al.

[11] 4,286,289
[45] Aug. 25, 1981

[54] TOUCH SCREEN TARGET DESIGNATOR

[75] Inventors: Robert B. Ottesen, Huntsville; Gerald L. Morris, Athens, both of Ala.

[73] Assignee: The United States of America as represented by the Secretary of the Army, Washington, D.C.

[21] Appl. No.: 89,826

[22] Filed: Oct. 31, 1979

[51] Int. Cl.³ .............................................. H04N 7/18
[52] U.S. Cl. ................................ 358/125; 340/365 A; 340/712; 178/18
[58] Field of Search ............ 358/125; 340/712, 365 C, 340/365 PC; 178/18-20; 244/3.16

[56] References Cited

U.S. PATENT DOCUMENTS

| | | | |
|---|---|---|---|
| 3,662,105 | 5/1972 | Hurst et al. | 178/18 |
| 3,673,327 | 6/1972 | Johnson et al. | 340/712 |
| 3,731,392 | 5/1973 | Cantella et al. | 244/3.16 |
| 3,916,099 | 10/1975 | Hlady | 178/18 |

FOREIGN PATENT DOCUMENTS 52-75763  6/1977  Japan ...................................... 358/125

Primary Examiner—Robert L. Richardson
Assistant Examiner—Edward L. Coles
Attorney, Agent, or Firm—Nathan Edelberg; Robert P. Gibson; Freddie M. Bush

[57] ABSTRACT

The touch screen target designator provides an interface between an operator and an automatic tracking system, which uses the operator's overpressure or touch on the displayed image of a target to designate the target for an automatic tracker. Necessary components include an imaging device/seeker, operator image display with touch screen, imaging tracker and control interface. In operation the operator touches the screen image of the target he desires to have tracked and this action automatically locks the tracker onto the selected target.

5 Claims, 2 Drawing Figures

TOUCH SCREEN TARGET DESIGNATOR

DEDICATORY CLAUSE

The invention described herein may be manufactured, used, and licensed by or for the Government for governmental purposes without the payment to us of any royalties thereon.

BACKGROUND OF THE INVENTION

Superimposed on existing imaging tracker displays are courser symbology, commonly a field of view (FOV) centered cross-hair, which the operator positions over the target he desires to designate by using a joy stick, track ball, or strain gauge device external to the imaged display. Once designated, the target is handed over to an automatic tracker. Some non-imaging display systems have used a light pen to designate a target.

Touch screen devices have been used as a menu-board type of input from a cathode ray tube or terminal (CRT) station, or for a radar/non-imaging display selection, wherein one item is selected from a group of options on the screen. However, the interface of a touch screen and an imaging tracker has not been previously done.

SUMMARY OF THE INVENTION

The touch screen target designator allows an operator observing targets imaged on a display device to merely touch the desired target on the imaging display to instantaneously (millisecond delay) position the courser symbology to that point for tracking designation. This union of a touch screen with an imaging tracker working from real world images allows real time selection of specific, recognizable objects from the field of view for processing or tracking. This greatly simplifies and speeds both still and moving target designation since a finger touch is all that is required to designate a target. It reduces the number of moving parts, such as a joy stick, and eliminates the umbilical connection external to the image, such as a light pen device.

DESCRIPTION OF THE PREFERRED EMBODIMENT

Figure 1:
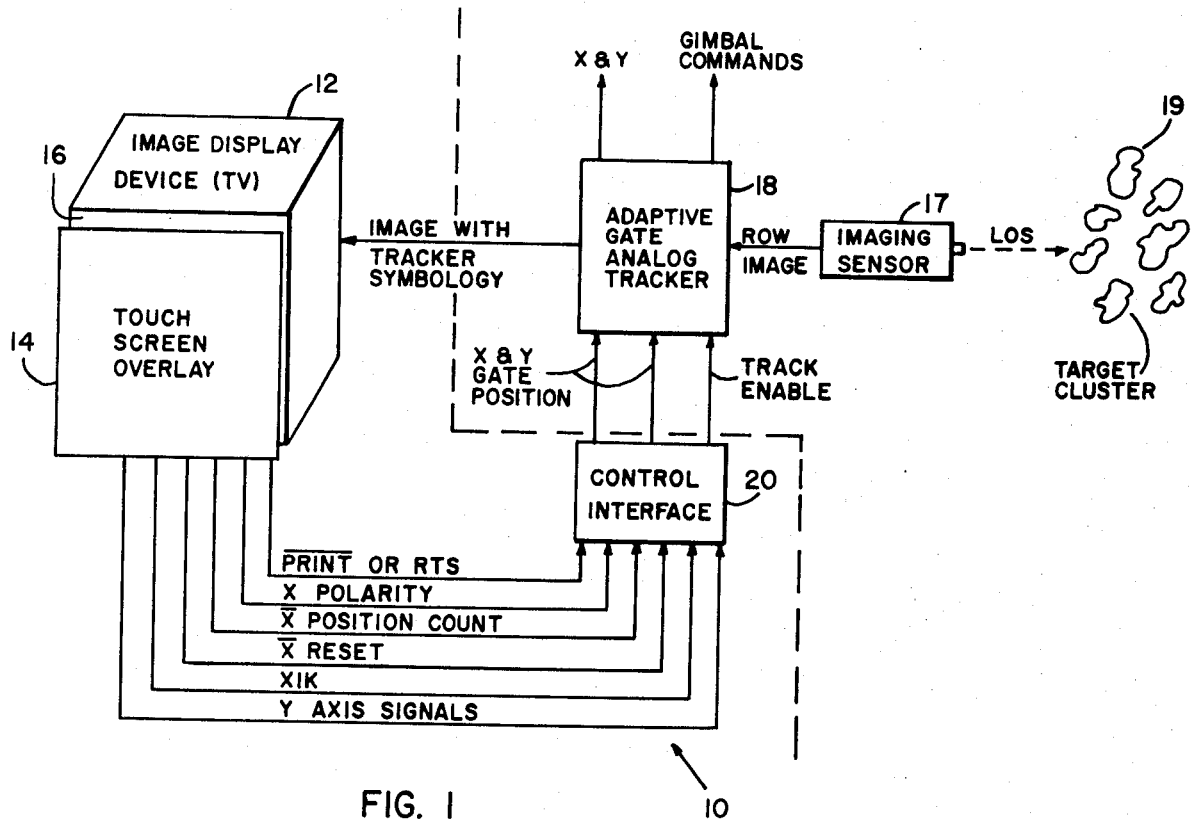
FIG. 1 is a block diagram of a preferred embodiment of the designator system.

Referring now to the drawings, FIG. 1 discloses a touch screen target designator 10 wherein an image display device 12 such as a television set, CRT, receives object images from a camera or sensor. A touch screen overlay 14 is disposed over the television screen 16 such that the object images received by the television 12 are viewable through the overlay 14 by an operator (not shown). Output signals from the touch screen 14 are coupled to a control interface 20. Input signals to the image display device 12 are detected by an imaging sensor 17 and coupled to a tracking device 18. The object image with tracker symbology (target aiming circle or cross-hair and confidence of track indication) are coupled as the input signal to the image display device. Tracking device 18 is an adaptive gate analog tracker for providing co-ordinate gimbal commands to maintain the position of the imaging sensor on the target during track. The position of a particular target within a target cluster 19 is identified by the operator touching the touch screen overlay to identify that particular target's x-y co-ordinates. This data is coupled to the control interface 20 and provides x and y gate position to tracker 18 so that gimbal commands are generated by the tracker in response to that object's position. In a missile system the gimbal commands are used to direct the missile to the target object. Where the sensor or camera is mounted on the missile, turning of the missile toward the object maintains the object centered in the field of view of the camera and insures a direct hit.

When the operator's finger is lifted from touch screen 14 a PRINT or RTS (Request to Send) command is sent through the control interface to provide a track enable command to tracker 18. This allows automatic tracking to occur for as long as the target remains within the field of view. If it is desired to change track, a touch of the screen resets the system by identifying a new set of co-ordinates and associated object for track. Typically, in a missile system, the imaging sensor 17 will be mounted on the missile and positioned for viewing the direction-of-flight of the missile. The gimbal commands from the tracker direct the missile toward the target identified by the touch screen.

A touch screen 14 can be ordered to fit standard imaging monitors 12. The touch screen consists of two transparent surfaces separated by a small insulating air gap. Pressure on the outer surface (a touch) completes the circuit where the transparent surfaces touch. X and y co-ordinate currents are pulsed sequentially through the touching surfaces, yielding a voltage drop in each axis proportional to touch position and thereby allowing the positioning of the courser symbology (cross-hairs) over the touch point. These x and y voltages are scaled then analog-to-digital converted and provided as inputs to an LED decade counter and an RS2 32 interconnection (not shown) in the touch screen circuitry. The control interface 20 inputs from the touch screen overlay come from a direct wire tap to this position signal input count to the LED decode counter. This position signal is then recounted as binary and and scaled before being coupled as an x-y position input to the tracker.

Figure 2:
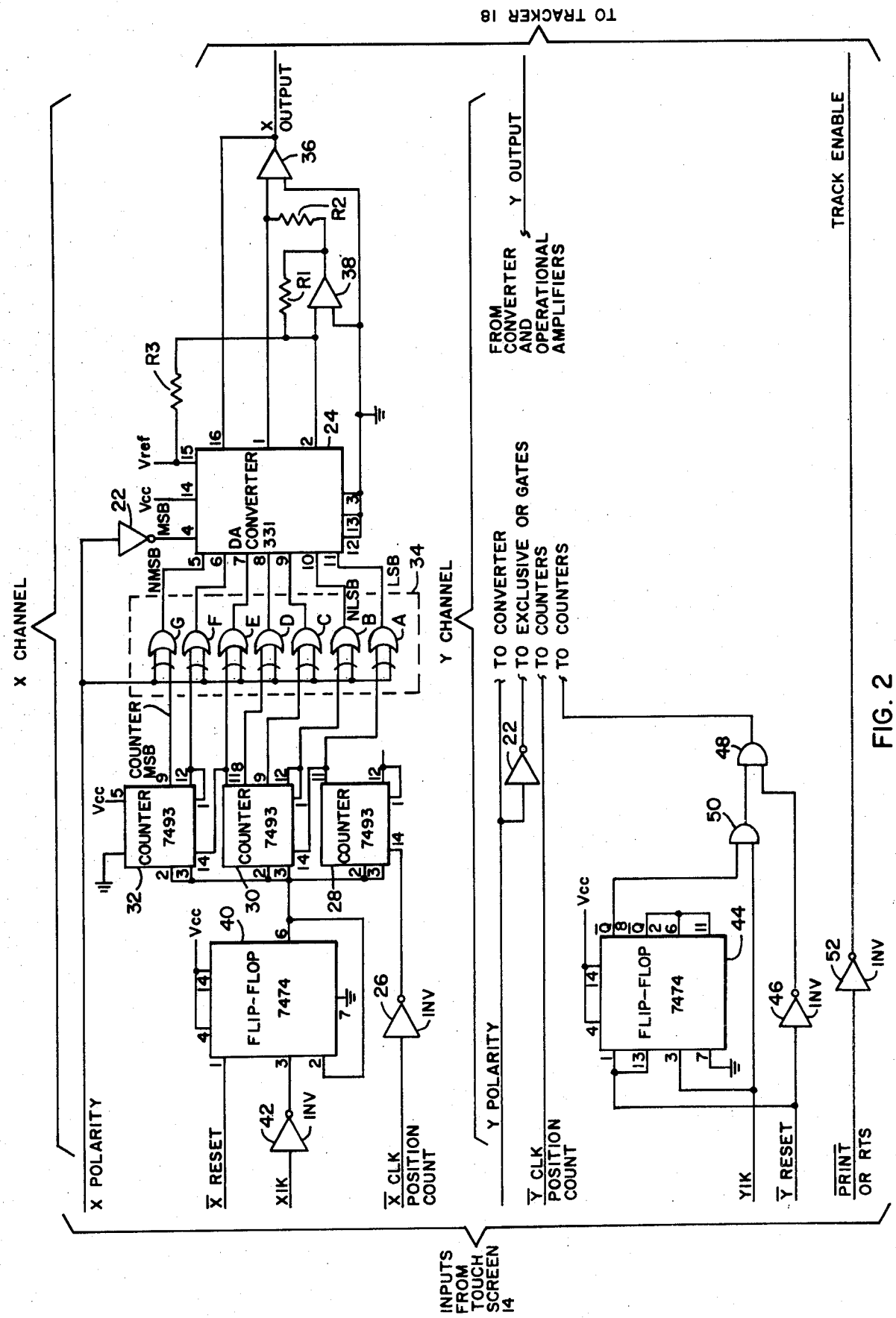
FIG. 2 is schematic of the control interface of FIG. 1 for coupling touch screen signals to the tracker.

FIG. 2 discloses the control interface circuit 20 responsive to the digital output from the touch screen to provide an analog output to tracker 18. Interface circuit 20 comprises respective x and y axis channels. The respective x axis channel and y axis channel are substantially identical circuitry. The x axis channel is, therefore, shown in detail and the y axis channel is shown in detail only where it differs. Respective x and y inputs to the interface 20 from the touch screen include the position count (CLK) input, a polarity input for quandrant identification, a reset pulse to clear counters, and an overflow signal (XIK) from the decade counter used to initialize the count stream.

As shown with respect to the x axis channel, the x polarity input is coupled through an inverter 22 to an input of a digital-to-analog converter 24 for identifying the hemisphere x-axis value. The position count or clock input is coupled through an inverter 26 to a 4-bit binary counter 28. Counter 28 is connected in series with similar counters 30 and 32. The selected outputs from counters 28, 30 and 32 are coupled through a hemisphere logic circuit 34 to the digital-to-analog converter 24 inputs. Logic circuit 34 is an array of exclusive OR gates having two inputs and a single output. One input of each of the OR gates is coupled in parallel with the other gates directly to the non-inverted polarity input signal. Each of the other inputs are coupled to respective counter outputs to establish the digital count input to converter 24. Thus the least significant bit is coupled from terminal 11 of counter 28 through gate 34A to terminal 11 of D/A converter 24. Similarly, counter 30 has output terminals 12, 9, 8, and 11 coupled respectively through gates 34B-E to terminals 10, 9, 8, and 7 of converter 24. Likewise, counter 32 has outputs 12 and 9 coupled through respective gates F and G to respective terminals 6 and 5 of the converter. Terminal 14 of counter 28 receives the input count from inverter 26. As the count progresses, data is coupled from terminal 11 of counter 28 to terminal 14 of counter 30 and similarly ripples through to counter 32.

A first operational amplifier has a negative input coupled to terminal 1 of D/A converter 24 to receive the first output therefrom. Amplifier 36 has an output coupled to provide the voltage output indicative of axis position to the tracker 18, and coupled to provide a feedback signal to the converter 24. The second output terminal 2 of converter 24 is coupled to a negative input of an operational amplifier 38. The output of amplifier 38 is coupled back to the negative input through a resistance R1 to provide feedback and to the negative input of amplifier 36 through a resistance R2. Appropriate supply voltage identified as Vcc and system ground is supplied to the respective components. The positive inputs to amplifiers 36 and 38 are also coupled to ground. A reference voltage, Vref, is coupled to converter 24 and through a resistance R3 to the negative input of amplifier 38. Amplifiers 36 and 38 convert the current output from converter 24 to a bipolar voltage output.

The circuitry which differs between the two channels is that which receives the reset pulse and initializes the count through Y1K, since the beginning count is 1000 on x-axis and 2000 on y-axis. A single triggered flip-flop is coupled to receive the $\bar{x}$ axis reset input pulse. An X1K input is also coupled through an inverter 42 to the flip-flop, and the output of the flip-flop is connected in parallel to the three counters for resetting the counters.

The $\bar{x}$ axis reset input pulse is coupled to the clear input of a dual, triggered flip-flop 44 and through an inverter 46 to one input of an OR gate 48. An Y1K input is coupled to a clock input of flip-flop 44 and to one input of an OR gate 50. The output of flip-flop 44 is coupled as the other input to gate 50. The output of gate 50 is coupled as the other input to gate 48 and the output of gate 48 is coupled to the terminals 2 and 3 of the respective counters for resetting the counters. Additionally, the y-channel polarity input is inverted to match the conventional quadrant of the touch screen for signal processing. Thus the inverter 22 output of the y channel goes to the exclusive OR gates instead of the converter.

The slight difference in the x and y axis input circuits are due to the initialized digital count differences. In screen 14, the analog-to-digital converter count initializes to 1000 in the x domain but initializes to 2000 in the y domain, hence the overflow is detected differently on each axis. If both circuits of the screen overlay did initialize to the same value, the x and y reset inputs of control interface 20 would be identical.

The polarity signals are logic levels indicating the hemisphere touched on the screen. They constitute the most significant bit (MSB) input to D/A converter 24 pin 4 operating in a bipolar configuration. $\bar{X}$ position input is the CLK pulse train picked off from the touch screen display control card before it is input to the binary coded decimal counters (7490's) and seven segment LED drivers (7447's) which are part of the touch screen circuits. This signal is directed to the control interface 20 counters, which merely count up and provide the seven bit count to converter 24. Thus, counters 28, 30, and 32 perform substantially the same count as the 7490 counters in the touch screen circuit and are latched to their count until reset, insuring that the converter 24 maintains a constant voltage for the axis position. Due to the size of the human finger being larger than the screen image of most targets of interest, the 7-bit count accuracy into the D/A converter 24 is sufficient to position the tracker adaptive gate, which then expands and tracks. The touch screen has a delay in its output circuits for analog-to-digital settling. This signal, either $\overline{PRINT}$ or RTS (Request to Send) is used to enable the track function. As shown in FIG. 2, the $\overline{PRINT}$ or RTS output is coupled through an inverter 52 in the interface circuit 20 to provide the track enable input to the tracker. All interface functions are asynchronous.

The touch screen target designator positions the target track gates on or around an imaged target. In this mode of operation a target or group of targets appear on the touch screen as real images of an object rather than radar blips or computer generated image/data. The operator selects and touches a target on the screen and the track gate counters 28, 30, and 32, 40 are reset to zero (cleared). The touch screen generates a pulse train corresponding to x and y analog position. The pulse train position is counted into counters 28, 30, and 32 for each axis. This binary count is fed to D/A converter 24. The outputs of D/A converter 24 is then scaled and applied to track gate position inputs of the tracker, which were, typically, controlled in the prior art by a joy stick. The track function is then enabled by removal of the touch, thereby sending the track enable command and allowing the tracker gates to be slewed or repositioned each time a touch is sensed.

Since no mechanical interaction is required once the screen is touched, the complete cycle will require less than 500 msec. Repeated target designation (touches) are only limited by human response.

The touch screen target designator can be operated with all of the components being off the shelf items. For example:

| Component | Part No. | Typical Source |
| --- | --- | --- |
| Inverters 26, 52, etc. | 7404 (Hex Inverter) | Fairchild, Raytheon |
| Flip-flops | 7474 (Dual D-type) | Fairchild, Raytheon |
| Counters 28, etc. | 7493 (4-Bit Binary) | Motorola, Raytheon |
| Converter 24 | 331 (10-Bit Binary) | Hybrid Systems |
| Amplifiers 36, etc. | 747 | Fairchild, Raytheon |
| Touch Screen 14 | Model E-270 | Elographics Co. Oak Ridge, Tenn. |

Although a particular embodiment and form of this invention has been illustrated, it is apparent that various modifications and embodiments of the invention may be made by those skilled in the art without departing from the scope and spirit of the foregoing disclosure. For example the touch screen target designator could provide direct control of seeker gimbal position/slew by touching preselected locations on the screen or by having a separate screen adjacent the first screen to provide this function. Once the gimbals have been slewed to position the target within the field of view the operating system is the same. Implementation would require a microprocessor controller such as a Z8000 or 8080A microprocessor for use with a single screen. Similarly an all digital system could be employed by using a digital tracker instead of an analog tracker. However, touch screen designation remains the same for all these embodiments. Accordingly, the scope of the invention should be limited only by the claims appended hereto.

We claim:

1. In a target tracking system having a tracker for providing gimbal commands for pointing an object along a target line-of-sight, an imaging sensor means for detecting the target position with respect to the object line-of-sight, and an image display means for visually displaying the target image, the improvement comprising: a touch screen overlay disposed adjacent the image display means for viewing visual display of said target image therethrough and having touch selectable outputs identifying where coordinates are touched on the touch screen, and control interface means coupled between said touch screen overlay outputs and said tracker for providing track enable and coordinate position input signals indicative of said target position in the field of view of said imaging sensor means said control interface means comprising first and second channels coupled to said touch screen outputs for separately processing signals indicative of respective x and y coordinate data and a track enable signal to said tracker, each of said channels comprising counter means adapted to receive coordinate axis input data and reset input data, a digital to analog converter, quadrant logic means adapted for coupling signal data from said counter means to said converter, and operational amplifier means coupled to and responsive to said converter for providing coordinate axis output data for providing tracker input position data.

2. A target tracking system as set forth in claim 1 wherein said counter means comprises first, second, and third 4-bit counters connected in series for providing 7-bit data output to said quadrant logic means; and said logic means being an array of exclusive OR gates for coupling said 7-bit data to said digital-to-analog converter.

3. A target tracking system as set forth in claim 2 and wherein said first channel further comprises a single flip-flop circuit coupled between said counter means and said touch screen for providing a reset input to said counter means in response to a reset output from said touch screen.

4. A target tracking system as set forth in claim 3 wherein said second channel further comprises a dual flip-flop circuit and an OR gate array coupled between said second channel counter means and said touch screen for providing a reset input to said counter means in response to a reset output from said touch screen, said reset output being inverted and coupled to said OR gate array and being coupled through said dual flip-flop circuit to said OR gate array for selectively resetting said counters simultaneously with the resetting of said first channel counters.

5. A target tracking system as set forth in claim 4 wherein said first and second channel flip-flop circuits are adapted to receive an initializing input signal for initializing the count stream.

* * * * *